(12) United States Patent
Thomas et al.

(10) Patent No.: US 12,563,486 B1
(45) Date of Patent: Feb. 24, 2026

(54) SYSTEMS AND METHODS FOR IDENTIFYING DATA RISK IN NETWORK CONNECTIONS

(71) Applicant: United Services Automobile Association (USAA), San Antonio, TX (US)

(72) Inventors: Anto Chirayil Thomas, Coppell, TX (US); Subhalakshmi Selvam, Allen, TX (US); Charlotte Thomas Creech, San Antonio, TX (US); Nathan Lee Post, Rockport, TX (US); Mathew Cyriac Kottoor, San Antonio, TX (US); Nina Cooper, San Antonio, TX (US); Reynaldo Medina, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 323 days.

(21) Appl. No.: 18/192,773

(22) Filed: Mar. 30, 2023

Related U.S. Application Data

(60) Provisional application No. 63/326,110, filed on Mar. 31, 2022.

(51) Int. Cl.
| | |
|---|---|
| *H04W 48/20* | (2009.01) |
| *H04L 9/40* | (2022.01) |
| *H04W 12/102* | (2021.01) |
| *H04W 48/16* | (2009.01) |
| *H04W 48/18* | (2009.01) |

(52) U.S. Cl.
CPC ......... *H04W 48/20* (2013.01); *H04L 63/1441* (2013.01); *H04W 12/102* (2021.01); *H04W 48/16* (2013.01); *H04W 48/18* (2013.01)

(58) Field of Classification Search
CPC ... H04W 48/20; H04W 12/102; H04W 48/16; H04W 48/18; H04L 63/1441
See application file for complete search history.

(56) References Cited

U.S. PATENT DOCUMENTS

2007/0261112 A1* 11/2007 Todd .................. H04L 63/1483
726/2

* cited by examiner

*Primary Examiner* — Diane D Mizrahi
(74) *Attorney, Agent, or Firm* — Fletcher Yoder, P.C.

(57) ABSTRACT

Provided herein are systems and methods for evaluating available networks in a known environment. Based upon the evaluation, a quality indication of the networks are provided to a user or operator of devices seeking to connect to at least one of the available networks.

19 Claims, 4 Drawing Sheets

100

102

102'

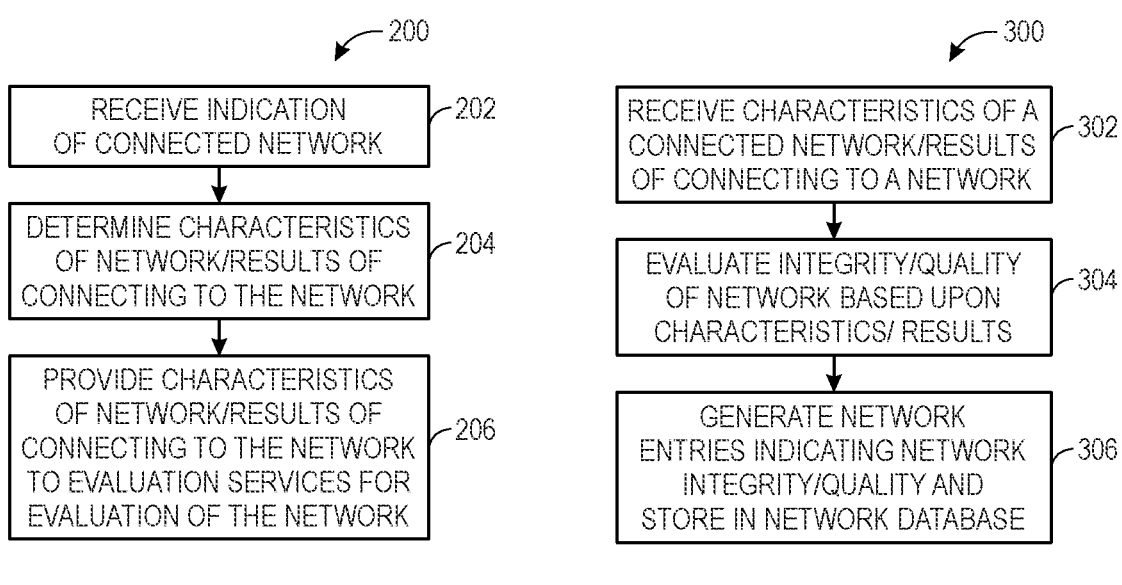
*FIG. 2*
*FIG. 3*
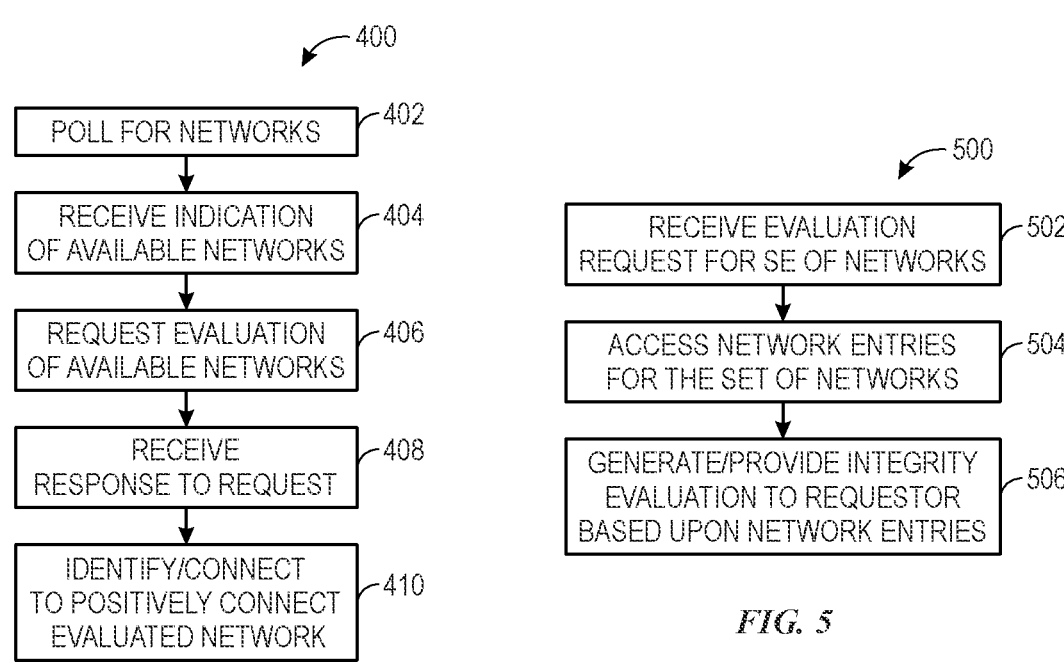
*FIG. 4*
*FIG. 5*

600

700

SYSTEMS AND METHODS FOR IDENTIFYING DATA RISK IN NETWORK CONNECTIONS

CROSS-REFERENCE TO RELATED APPLICATION

This application claims priority to and the benefit of U.S. Provisional Patent Application No. 63/326,110, filed Mar. 31, 2022, entitled "SYSTEMS AND METHODS FOR IDENTIFYING DATA RISK IN NETWORK CONNEC-TIONS," the disclosure of which is incorporated by reference herein in its entirety for all purposes.

TECHNICAL FIELD

The present disclosure relates generally to systems and methods for identifying data risk in network connections for the purpose of alerting users of network safety concerns with regards to potential network connections.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Users or operators of devices may be provided a multitude of different available network options. Identifying the best network may be difficult, as users may not be able to determine which, if any, of the different available networks are endorsed or otherwise provided by a trusted source. In some instances, a user may not be aware that some of the available networks possess a negative quality. In such instances it may be advantageous for a user to be alerted that a particular network possesses a negative quality.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments provided herein relate to a network evalu-ation service that evaluates available networks in a known environment and provides a quality indication of the net-works to a user or operator of devices seeking to connect to at least one of the available networks.

It is also appreciated that implementations in accordance with the present disclosure can include any combination of the aspects and features described herein. That is, imple-mentations in accordance with the present disclosure are not limited to the combinations of aspects and features specifi-cally described herein, but also include any other appropriate combinations of the aspects and features provided.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a flowchart of a process for acquiring charac-teristics of a network connected to the computing device, according to embodiments of the present disclosure;

FIG. 3 is a flowchart of a process for a network evaluation service to evaluate a quality of network based upon acquired network characteristics, according to embodiments of the present disclosure;

FIG. 4 is a flowchart of a process for requesting evalua-tion of available networks, according to embodiments of the present disclosure;

FIG. 5 is a flowchart of a process for receiving and responding to a request to evaluate the quality of a set of networks, according to embodiments of the present disclo-sure;

DETAILED DESCRIPTION

Figure 1:
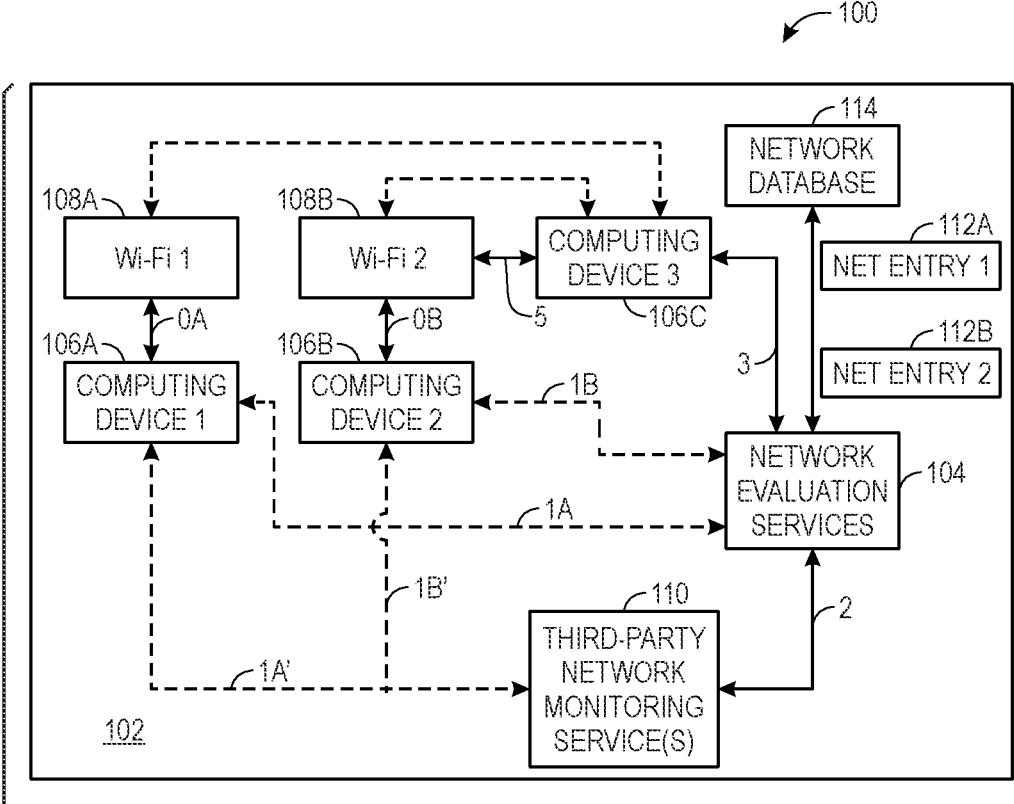
FIG. 1 is a schematic diagram of an environment con-taining a network evaluation service that receives charac-teristics of nearby networks, stores the characteristics in a network database, and communicates details of the charac-teristics to one or more computing devices attempting to connect to one of the nearby networks, in accordance with embodiments described herein.
Figure 1:
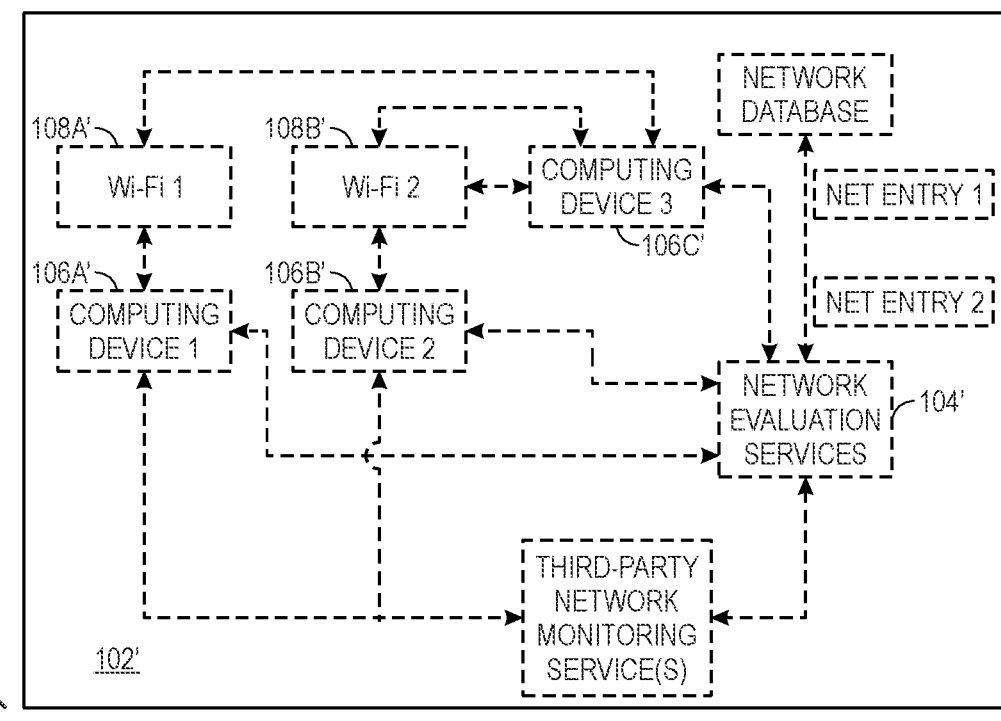

One or more specific embodiments will be described below. In an effort to provide a concise description of these embodiments, not all features of an actual implementation are described in the specification. It should be appreciated that in the development of any such actual implementation, as in any engineering or design project, numerous imple-mentation-specific decisions must be made to achieve the developers' specific goals, such as compliance with system-related and business-related constraints, which may vary from one implementation to another. Moreover, it should be appreciated that such a development effort might be com-plex and time consuming, but would nevertheless be a routine undertaking of design, fabrication, and manufacture for those of ordinary skill having the benefit of this disclo-sure.

When introducing elements of various embodiments of the present disclosure, the articles "a," "an," and "the" are intended to mean that there are one or more of the elements. The terms "comprising," "including," and "having" are intended to be inclusive and mean that there may be addi-tional elements other than the listed elements. Additionally, it should be understood that references to "one embodiment" or "an embodiment" of the present disclosure are not intended to be interpreted as excluding the existence of additional embodiments that also incorporate the recited features.

In the following description, for the purposes of expla-nation, numerous specific details are set forth in order to provide a thorough understanding of embodiments of the present disclosure. It will be apparent, however, to one skilled in the art that embodiments of the present disclosure may be practiced without some of these specific details.

The embodiments described herein include systems and methods for evaluating available networks in an environment and providing a quality indication of the networks to a user or operator of devices seeking to connect to at least one of the available networks. For example, a network evaluation service may receive characteristics of a number of nearby networks (e.g., from computing devices that may be connected to the networks). The network evaluation service may then store the characteristics of the networks in a network database. The stored characteristics (or an indication of an evaluation of the characteristics) may further be sent to a computing device that may be seeking to connect to one of the networks. The computing device may receive the characteristics for one or more of the available nearby networks, and may select to join or avoid a nearby network based on the characteristics sent by the network evaluation service.

In addition, as described in greater detail herein, in one embodiment the network evaluation service may monitor a network stack of a computing device connected to the network evaluation service. For example, the network evaluation service may monitor foreground network operations occurring on the computing device. In addition, the network evaluation service may monitor background network operations occurring on the computing device. The network evaluation service may determine that one or more background network operations are unexpected operations, or operations that the user of the computing device was not aware of or did not authorize. In response, the network evaluation service may alert the user of the computing device of the unexpected or unauthorized operations. The network evaluation service may also prompt the user of the computing device to block the unexpected or unauthorized operations from the computing device.

The embodiments described thus far are intended only to be illustrative of some of the example operations of the disclosed invention, and are not intended to be limiting. The embodiments described thus far, as well as others yet to be described, will be described in fuller detail below.

FIG. 1 is a schematic diagram of a system 100 including a network evaluation service 104 that receives characteristics of nearby networks 108a and 108b from computing devices 106a and 106b through connections 1a and 1b, stores the characteristics in a network database 114 through net entries 112a and 112b, and communicates details of the characteristics to a computing device 106c through connection 3, wherein the computing device 106c may be seeking to connect to and/or is able to connect to one of the nearby networks 108a or 108b through potential connections 4a and 4b. In some embodiments the computing device 106c may connect to a particular one of the networks 108a or 108b, based upon the details provided via the network evaluation services 104. For example, in the depicted embodiment, Computing Device 3 selects to connect to network 108b through a connection 5, based upon more favorable characteristic details provided from the Network Evaluation Services 104.

In certain embodiments, the network evaluation service 104 may connect to one or more third party monitors 110 through a connection 2, which may also connect to the computing devices 106a and 106b through the connections 1a' and 1b', respectively. The third party monitor 110 may be a network authority of the environment 102 and may indicate whether a network is an official network of the environment. In some embodiments, the computing devices 106a and 106b may send characteristics of nearby networks 108a and 108b to the network evaluation service 104 through connections 1a and 1b, respectively, and to the third-party monitor 110, through the connections 1a' and 1b', respectively.

The computing devices 106a and 106b may be connected to the networks 108a and 108b, through the connections 1a and 1b, respectively. The networks 108a and 108b may include public networks such as the Internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile networks (e.g., 3G, 4G, Edge, etc.), and so forth. The computing device 106a may be connected to the network 108a through a connection 0a, and the computing device 106b may be connected to the network 108b through a connection 0b. It should be understood that there may be any number of networks beyond those listed. Each network may have any number of computing devices connected to them. The computing devices 106a and 106b, as well as other computing devices that may be connected to or seeking to connect to the networks 108a and 108b, such as the computing device 106c, may be any type of computing device capable of connecting to a network.

For example, the computing devices 106a, 106b, and 106c may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing devices as physical devices, certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them.

In some embodiments, the network evaluation service 104 may be communicatively connected with computing devices 106a and 106b through the connections 1a and 1b, respectively. For example, when a user of the computing device 106a enters into the environment 102, they may be prompted to connect to the network evaluation service 104. In another embodiment, the connection 1a to the network evaluation service 104 may be established automatically, without requiring the user to actively connect to the network evaluation service. In yet another embodiment, the connection 1a to the network evaluation service 104 may be initiated by the third party network monitoring service 110. For example, in the environment 102, which may be an airport, business, or any other location, the third-party monitoring service 110 may be associated with the airport, business, etc., and may be tasked with ensuring that every computing device that comes into the environment 102 is subsequently communicatively connected to the network evaluation service 104. In some embodiments, the computing devices 106a and 106b are already connected to networks 108a and 108b prior to connecting to the network evaluation service 104, while the computing device 106c may not be connected to any network when the connection 3 between computing device 106c and the network evaluation service 104 is initiated. In other embodiments, none of the computing devices 106a, 106b, or 106c may be connected to a network when the connections 1a, 1b, and 3 are initiated.

Once communicatively connected to the computing devices 106a and 106b through the connections 1a and 1b, the network evaluation service 104 may request that the computing devices 106a and 106b submit characteristics of their respective networks. These characteristics may include download speed, whether the network is malicious or secure, whether or not the network is known or associated with the environment 102 (for example, the official guest Wi-Fi network at a business location), or any other characteristic that may be used to compare between networks. In response to the request from the network evaluation service 104, the computing devices 106a and 106b may submit the requested characteristics to the network evaluation service 104 through the connections 1a and 1b. In the event that one or more of the computing devices 106a or 106b are not connected to one of the networks in the environment 102, such as the networks 108a or 108b, when the network evaluation service 104 requests the characteristics of the networks 108a and 108b, the one or more computing devices 106a or 106b may automatically submit to the network evaluation service 104 such characteristics as soon as the one or more computing devices 106a or 106b connects to one of the network 108a or 108b.

Upon receipt of the characteristics from the computing devices 106a and 106b, the network evaluation service 104 may perform evaluations on the characteristics to determine a quality of the networks 108a and 108b. This quality may be based on the characteristics sent by computing devices 106a and 106b. In an embodiment, the network evaluation service 104 may determine that the quality of the network 108a is superior to the quality of the network 108b. For example, the network evaluation service 104 may determine that network 108a has a higher downloading speed than the network 108b. As another example, the network evaluation service 104 may determine that the network 108a is associated with the environment 102 as an official network, whereas the network 108b may not be. This may be done by matching data received from an official component of the environment (e.g., a key, passcode, etc.) and comparing this data with data characteristics received from the network (e.g., network 108a and/or 108b). As yet another example, the network evaluation service 104 may determine that the network 108a has no history of malicious activity and/or that network 108b may have such a history. In some embodiments, a relative comparison of malicious activity between the networks 108a and 108b may be derived to identify the preferable network. This may be done by analyzing and/or comparing received connection results from clients of the networks 108a and/or 108b. This evaluation may consider characteristics other than those enumerated, and the examples of how the network evaluation service 104 might evaluate the characteristics is not intended to be an exhaustive list of examples.

Further, the network evaluation service 104 may determine that the networks 108a and 108b are both of similar quality. For example, the networks 108a and 108b may have similar download speed, history of malicious activity, authorization status, or any other characteristic that may be sent from the computing devices 106a and 106b to the network evaluation service 104. The network evaluation service 104 may determine that the networks 108a and 108b have similarly high quality, or that the networks 108a and 108b have similarly low quality. In such a case there may not be a preferred network indicated from the network evaluation services 104.

Regardless of what quality the network evaluation service 104 determines is associated with one or more of the networks 108a and 108b, the network evaluation service 104 may then create the net entries 112a and 112b associated with the evaluated quality of the networks 108a and 108b respectively, and input them into the network database 114. For example, the network evaluation service 104 may generate the entries 112a and 112b to input into the network database 114. For instance, the net entry 112a may be associated with the evaluated quality of network 108a and the net entry 112b may be associated with the evaluated quality of network 108b. Although the networks 108a and 108b have been described, it should be understood that any number of networks may be evaluated by the network evaluation service 104, and that a corresponding number of net entries may be entered into the network database 114. The network database 114 may be any appropriate database, and may either be a native part of the environment 102 or a remote database that is accessible by the network evaluation service 104.

Additionally, the network evaluation service 104 may be connected to the computing device 106c through the connection 3. The computing device 106c may be seeking to connect to a network in the environment 102. The computing device 106c may poll for networks to identify what networks are available in the environment 102. In an embodiment, the computing device 106c may seek a potential connection with any number of the available networks in the environment 102. For instance, in an embodiment where the networks 108a and 108b are available in the environment 102, the computing device 106c may seek to connect to either of them through the potential connections 4a and 4b. To determine whether to connect to the network 108a or 108b, the computing device 106c may send a request for information to the network evaluation service 104 to identify what qualities are associated with the networks in the environment 102, for instance, the networks 108a and 108b. If the network database 114 has entries associated with network characteristics of networks in the environment 102, for example if the entries 112a and 112b are populated with the characteristics of the networks 108a and 108b, then the network evaluation service 104 may respond to the computing devices 106c's request by submitting the relative qualities of the networks 108a and 108b. However, if there are no entries in the network database 114 at the time that the computing device 106c submits the request, then the network evaluation service 104 may send a response to the computing device 106c that no information could be found regarding the quality of networks in the environment 102.

Alternatively, if the network database 114 does not contain net entries identifying the quality of networks 108a and 108b, the network evaluation service 104 may, upon receiving the request from the computing device 106c, submit a request to the computing devices 106a and 106b for characteristics of the networks 108a and 108b. The network evaluation service 104 may, in response to receiving the characteristics of networks 108a and 108b from computing devices 106a and 106b, input the characteristics into the network database 114 through the net entries 112a and 112b. The network evaluation service 104 may then submit to the computing device 106c a response containing the qualities of networks in the environment 102. In some embodiments, an indication that the network characteristics are unknown may be provided.

The response that the network evaluation service 104 may submit to the computing device 106c may include information pertaining to a single network or multiple networks. For example, if the network 108a is determined to have a higher quality than the network 108b, then the network evaluation service 104 may only include an indication that the network 108a has a high quality in the response. Alternatively, the network evaluation service 104 may return a list of networks. For example, the network evaluation service 104 may submit a response that indicates that there are two networks in the environment, the network 108a and 108b. Further, the response may indicate that the network 108a has been evaluated to be of a higher quality than the network 108b.

Additionally, the response may color code the results. For example, a network that has been evaluated to have a low quality, for the example network 108b, may be marked with a red color. Further, a network that has been evaluated to have a high quality, for example the network 108a, may be marked with a green color. Further, a network that has been evaluated to have an average quality may be marked with a yellow color. It should be understood that although the colors red, yellow, and green are used to describe markers to differentiate between network qualities, it should be understood that any color, or indeed any differentiating marker (for example, a cross or a checkmark) may also be used to signify whether a network has been evaluated to have a high quality or a low quality. Alternatively, a different marker, such as the color blue or a question mark, or any other marker, may be used to indicate that a quality of a network has not been evaluated by the network evaluation service 104.

Further, the network evaluation service 104 may opt to not include an indication that a network with a low quality is available in the response. For example, if both the networks 108a and 108b have been evaluated to have a low quality, and there are no other networks in the environment 102, then the network evaluation service 104 may return an indication that there are no quality networks available. Alternatively, if both the networks 108a and 108b have been evaluated to have a low quality, but the low qualities are based off of different characteristics, then one of the networks may be included in the response. For example, if the network 108a was determined to have a low quality because there was evidence that the network was malicious, it may not be included in the response. However, if the network 108b was determined to have a low quality because the downloading speed was lower than a desired speed, such as a predetermined threshold speed, then that low quality network may still be included in the response as an available network in the environment 102.

It should be understood that the examples of characteristics that are determinative of whether a low quality network may still be included in the network evaluation service 104's response to the computing device 106c are not intended to be limiting. For example, an administrator of the environment 102 may select any number of characteristics to be determinative of such masking. For example an administrator of the environment 102 may select that any network not authorized or screened by the administrator or a designated screener should not be included in the network evaluation service 104 response to the computing device 106c. Although an administrator and screener have been mentioned, these roles need not be filled by a specific individual. Rather, the environment 102 may have systems in place that automatically differentiate between characteristics determinative of whether or not a low quality may still be included in the network evaluation service 104's response to the computing device 106c and characteristics that are not determinative of such. In some examples these systems may be a part of the third party monitor 110.

In addition to the environment 102, there may exist a second environment 102' that is separate from and unassociated with environment 102. The environment 102' may have any or all of the same elements as the environment 102, such as a network evaluation service 104', computing devices 106a', 106b', and 106c', networks 108a' and 108b', and any other element. For example, in an embodiment where the environment 102 is a business, then the environment 102' may be a neighboring business. There may exist some overlap in the networks available in an environment. For example, in the environment 102 the network 108a may be named "Network A" and the network 108b named "Guest Network," and in the environment 102' there the network 108a' may be named "Network A'" and the network 108b' may be named "Guest Network." However, due to the proximity between the environments 102 and 102', as well as for any other reason, the computing device 106a may be able to connect to both the networks 108a and 108b from environment 102, as well as the networks 108a' and 108b' from environment 102', or to any number of such.

Because the characteristics may be different between the similarly named networks 108b and 108b', there may be a need to differentiate between the two. To this end, the network evaluation service 104 may identify the network 108b as "Guest Network" and the network 108b' as "Guest Network from environment 102'," or may otherwise differentiate the two in any other manner. This allows for a user of the computing device 106c, who may be seeking to connect to the highest quality available network, or to a network in the environment 102, to accurately differentiate between networks 108b and 108b', despite their similar name.

Further, although the illustrated embodiment in FIG. 1 shows the network evaluation services 104 and 104' located within the environment 102 and 102', respectively, in some embodiments a network evaluation service need not be within an environment 102 or 102'. Indeed, a common network evaluation service external to one or both of environments 102 and 102' may provide network evaluation services to an environment, even when remote from that environment.

FIG. 2 is a flowchart that describes a process 200 for providing network information that may be implemented by a computing device, such as the computing devices 106a or 106b.

In some embodiments, a computing device may connect to a nearby available network in the environment 102. For example, the computing device 106a may connect to the network 108a and the computing device 106b may connect to the network 108b, through connections 0a and 0b, respectively. These connections may be made at the request of an operator of the computing device 106a or 106b, or else may happen automatically when the computing devices 106a and 106b enter into the environment 102, or at any other time. Once the connection process has completed, the computing devices 106a and 106b may receive an indication signifying that the connection process has been completed (block 202).

One or more of the computing devices 106a or 106b may, upon receipt of the indication that the connection process has completed, determine characteristics of and/or results of connecting to their respective networks, for example the networks 108a or 108b (block 204). This determination of characteristics may be initiated automatically upon the completion of the setup for the connections 0a and 0b. Alternatively, this determination may be initiated automatically upon the completion of the connection setup between one or more of the computing devices 106a and 106b and the network evaluation service 104. Further, this determination may be initiated at the request of the network evaluation service 104 at any time.

Once the computing device 106a or 106b has completed the determination of the characteristics of the connected network (for example, the networks 108a or 108b), the computing device 106a or 106b may, automatically or at the request of the network evaluation service 104, provide the characteristics or other results of connecting to the network 108a or 108b to the network evaluation service 104 for evaluation of the characteristics or other results (block 206).

FIG. 3 is a flowchart that describes a process 400 for evaluating available networks, which may be implemented by the network evaluation service 104, as will be described herein.

In some embodiments, the network evaluation service 104 may receive, from one or more of the computing devices 106a or 106b, characteristics or other results of the computing devices 106a or 106b connecting to the network 108a or 108b (block 302). For example, the characteristics or other results of connecting to the network may include network speed, a certification of the network (e.g., with the environment of the network), possible detected malicious activity, etc.

The network evaluation service 104 may then evaluate a quality of the network 108a or 108b (block 304). The quality may be based on the characteristics or other results of the computing devices 106a or 106b connecting to the networks 108a or 108b. As described above, the evaluated quality may indicate that the network 108a or 108b is faster/slower than a desired network speed, whether or not the network 108a or 108b has a history or other evidence of being malicious, whether the network 108a or 108b is authorized or known by the environment 102, or any other characteristic. This quality may be determined in comparison to other networks in the environment 102. For example, the network 108a may have a quality of "higher quality" and the network 108b may have a quality of "lower quality". Specifically, the network 108a may have a quality of "higher quality than network 108b", and vice versa. Alternatively, the quality of one or more of the networks 108a and 108b may be determined irrespective of other networks in the environment 102. Rather, the quality may be determined as compared to requirements or other criteria established by the third party monitor 110 or another entity, which may be a network authority of the environment 102.

The network evaluation service 104 may then generate one or more network entries, for example the network entries 112a and 112b (block 306). One or more of the network entries 112a or 112b may contain the quality report and/or quality indication for a specific network. For example, the network entry 112a may contain the quality report for the network 108a, and the network entry 112b may contain the quality report for the network 108b. The network evaluation service 104 may then populate the network database 114 with the network entries 112a and 112b. The network database 114 may be any suitable database, and may be local to the environment 102 or remote.

FIG. 4 is a flowchart that describes a process 400 for implementing network connectivity based upon network evaluation, which may be implemented by the computing device 106c, as will be described herein.

In some embodiments, the computing device 106c may poll for nearby networks (block 402). For example, the computing device 106c may recently have come within the scope of the environment 102, and may seek to join a nearby network. To that end, the electronic device 106c may request or poll from the network evaluation service 104 a list of available networks. Additionally or alternatively, the electronic device 106c may request or poll this list from the networks directly.

The computing device 106c may subsequently receive an indication of available networks from the network evaluation service 104 or elsewhere (block 404). Further, a user of the computing device 106c may desire to know which, if any, of the nearby networks has a satisfactory quality report. Therefore, the computing device 106c may request further for an evaluation of the available networks from the network evaluation service 104 (block 406).

The computing device 106c may subsequently receive a response from the network evaluation service 104 (block 408). This response may include data from the net entries 112a and 112b, which may list the qualities of the networks 108a and 108b, respectively. As discussed above, the listed qualities of the nearby networks may be color coded or otherwise marked to indicate the quality of a network, either relative to other nearby networks or relative to external threshold requirements, which may be set up by the third party monitoring service 110.

The computing device 106c may then connect to the network with the highest quality and/or an acceptable quality, for example network 108b, through the connection 5 (block 410). Alternatively, the computing device 106c may connect to any other network, either on the list provided by the network evaluation service 104 or otherwise. Additionally and/or alternatively, the computing device 106c may refrain from connecting to a network with unacceptable quality.

FIG. 5 is a flowchart that describes a process 500 for providing an integrity evaluation for a set of networks, which may be implemented by the network evaluation service 104, as will be described herein.

In some embodiments, the network evaluation service 104 may receive an evaluation request for a set of networks (block 502). For example, the computing device 106c may request an evaluation of a set of nearby networks, for example the networks 108a and 108b.

In response to receiving this request, the network evaluation service 104 may access the net entries in the network database that are associated with the set of networks in the request, for example the net entries 112*a* and 112*b*, which may be associated with the networks 108*a* and 108*b* (block 504). As mentioned above, these net entries 112*a* and 112*b* may include data describing a list of the qualities of the networks 108*a* and 108*b*

The network evaluation service 104 may then generate a quality evaluation to the requestor (block 506). Specifically, the data from the network entries 112*a* and 112*b* may be used to generate the quality evaluation. For example, the data from network entry 112*a* may provide the data necessary to generate an evaluation of network 108*a*. Likewise, the data from network entry 112*b* may provide the data necessary to generate an evaluation of the network 18*b*.

Figure 6:
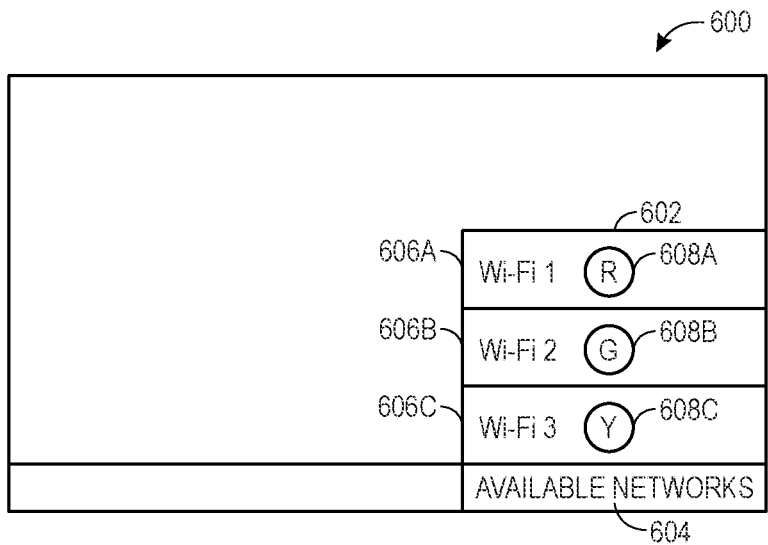
FIG. 6 illustrates an example of providing an indication of the quality of a set of networks, according to embodiments of the present disclosure.

FIG. 6 illustrates one embodiment of a graphical user interface that provides a quality report of nearby networks, as will be described herein. In some embodiments, once the computing device 106*c* has received a quality report for nearby networks, that quality report may be displayed on a display screen 600 of the computing device 106*c*. For example, in some embodiments a portion 602 of the screen 600 may be labeled "Available networks", which may be located on a banner 604 located on the screen 600. In some embodiments the banner 604 may be located on an exterior border of the screen 600, such as on the bottom. Further, the portion 602 of the screen 600 may include a list of all or some of the nearby networks, as evaluated by network evaluation service 104. For example, the list may include list entries 606*a*, 606*b*, and 606*c*, each of which may include a name of the network associated with it. Further, one or more of the list entries 606*a*, 606*b*, and 606*c* may be associated with indicia indicative of an associated network quality. For example, the list entries 606*a*, 606*b*, and 606*c* may be associated with a color coding to indicate a quality of the network named in the list entry 606*a*, 606*b*, or 606*c*, either relative to the other nearby networks or relative to an external quality requirement threshold, which may be established by the third-party monitoring service 110. For example, if the list entry 606*a*, associated with a network named "Wi-Fi 1", is determined to have a low quality, it may be marked with a red color 608*a*. Further, if the list entry 606*b*, associated with a network named "Wi-Fi 2", is determined to have a high quality, it may be marked with a green color 608*b*. Further, if the list entry 606*c*, associated with a network named "Wi-Fi 3", is determined to have either an average or alternatively an unascertainable quality, it may be marked with a yellow color 608*c* As discussed earlier, other forms of differentiation may be used to distinguish the quality of one network from another. For example, checks, crosses, and questions marks may be used, or any other color, symbol, or marker, in place of the colors 608*a*, 608*b*, and 608*c*.

Further, the order of the list entries 606*a*, 606*b*, and 606*c* may indicate their relative quality. For example, a network with a quality that is higher than other nearby networks may be listed above the other networks, wherein the relative placement of the network listing may be indicative of its relative quality. For an example, as illustrated in FIG. 6, the list entry 606*a* may have the highest quality, the list entry 606*b* may have an average quality, and the list entry 606*c* may have a low quality. Further, in some embodiments, networks that have malicious qualities or other undesirable qualities may not be displayed on the screen 600 at all, so that a user of the computing device 106*c* may not see network as being an available nearby network.

Figure 7:
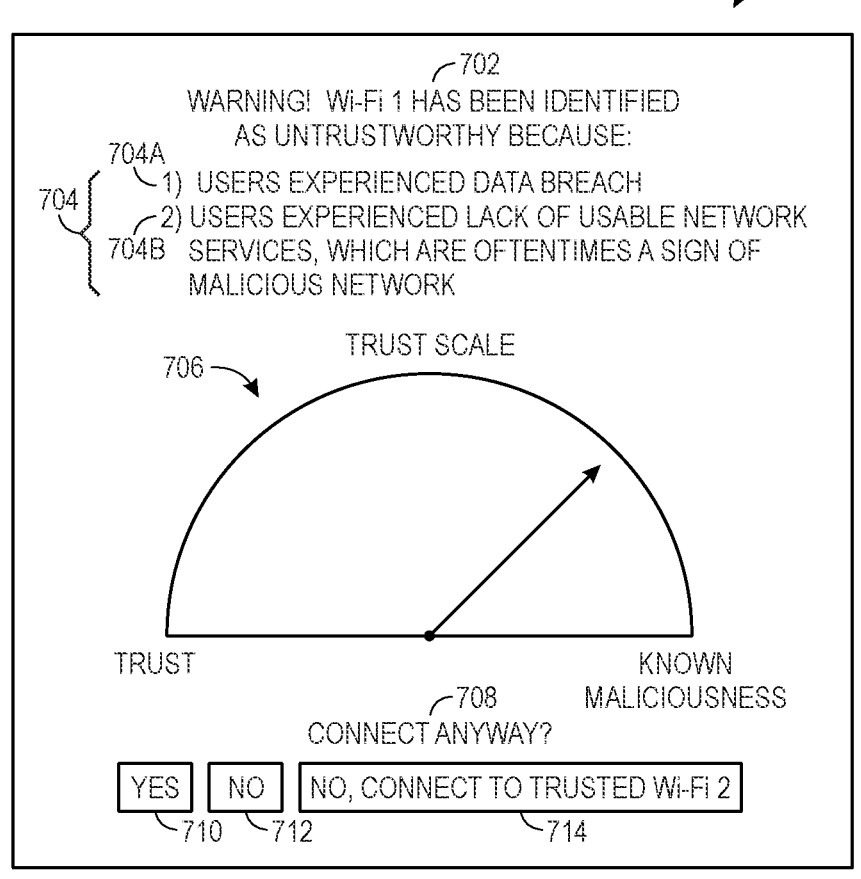
FIG. 7 illustrates an example of a provision of a warning based upon a network evaluation, according to embodiments of the present disclosure.

FIG. 7 illustrates an example embodiment of a graphical user interface, illustrating one feature of the network evaluation service 104, as will be described herein.

In some embodiments, the network evaluation service 104 may assist users of computing devices to avoid connecting to networks with a low quality. For example, after the computing device 106*c* has polled for nearby networks, a user of the computing device 106*c* may seek to connect to any one of the nearby networks. For example, a user of the computing device 106*c* may seek to connect to network 108*b*, which may have a low quality. This may occur before or after requesting and receiving an evaluation of available networks. In either case, if the user opts to connect to a network with a low quality such as the network 108*b*, either before knowing the quality or after receiving the quality report, the network evaluation service 104 may halt the connection and require the user to confirm their intent to connect to the network 108*b*, despite the low quality of the network. For example, as illustrated in FIG. 7, a warning message 700 may be sent to the screen of the computing device 106*c* in response to the computing device initiating a connection to a network with a low quality, such as the network 108*b*.

In some embodiments, the computing device 106*c* may not complete connection to the network 108*b* until confirming that the user of the computing device 106*c* desires to do so even knowing the risks associated with connecting to that network. For example, the warning message 700 may include an indication 702 that the network 108*b* has been identified as an untrustworthy network. Accordingly, the characteristic of the network 108*b* that formed the basis for an evaluation result of "low quality" may be a maliciousness of the network 108*b*. The message 700 may include details 704*a* and 704*b* describing what characteristics led to the negative quality report. For example, the message 700 may include detail the 704*a* that the network 108*b* has a history of users experiencing a data breach. As another example, the message 700 may include detail the 604*b* that users that have connected to the network 108*b*, such as the network 108*b*, or any other computing device that has connected to the network 108*b* in the past, have experienced a lack of usable network services. Such a lack of usable network services may be a feature that is common in malicious networks.

Further, in another embodiment, the message 700 may include a graphic 706 that indicates how high or low the quality of the network is. For example, when the quality of the network 108*b* is based on a maliciousness of the network, then the message 700 may include the graphic 706 that shows how likely the network 108*b* is to be malicious, based on the quality report. The graphic may be a scale, a chart, or any other graphic capable of showing a likelihood of maliciousness.

In another embodiment, the message 700 may prompt the user of the computing device 106*c* to select between several connection options. For example, a prompt 708 may ask the user if they wish to connect to the network 108*b* anyway, despite the warning message 700. For example, the user may choose either to connect to the malicious network 108*b*, as in option 710, to refrain from connecting to the malicious network 108*b*, as in option 712, or to connect to a trusted network, for example network 108*a* instead of the malicious network 108*b*, as in option 714.

Although the message 700 has been described as warning against the malicious network 108*b*, in another embodiment the message 700 may be sent to warn a user of the computing device 106*c* that the network 108*b* has a low quality, based on any number of characteristics. For example, the message 700 could warn the user that the network 108*b* is not authorized by the environment 102, or that the network 108*b* has a slow connection speed, or that any other characteristic has a low quality.

Figure 8:
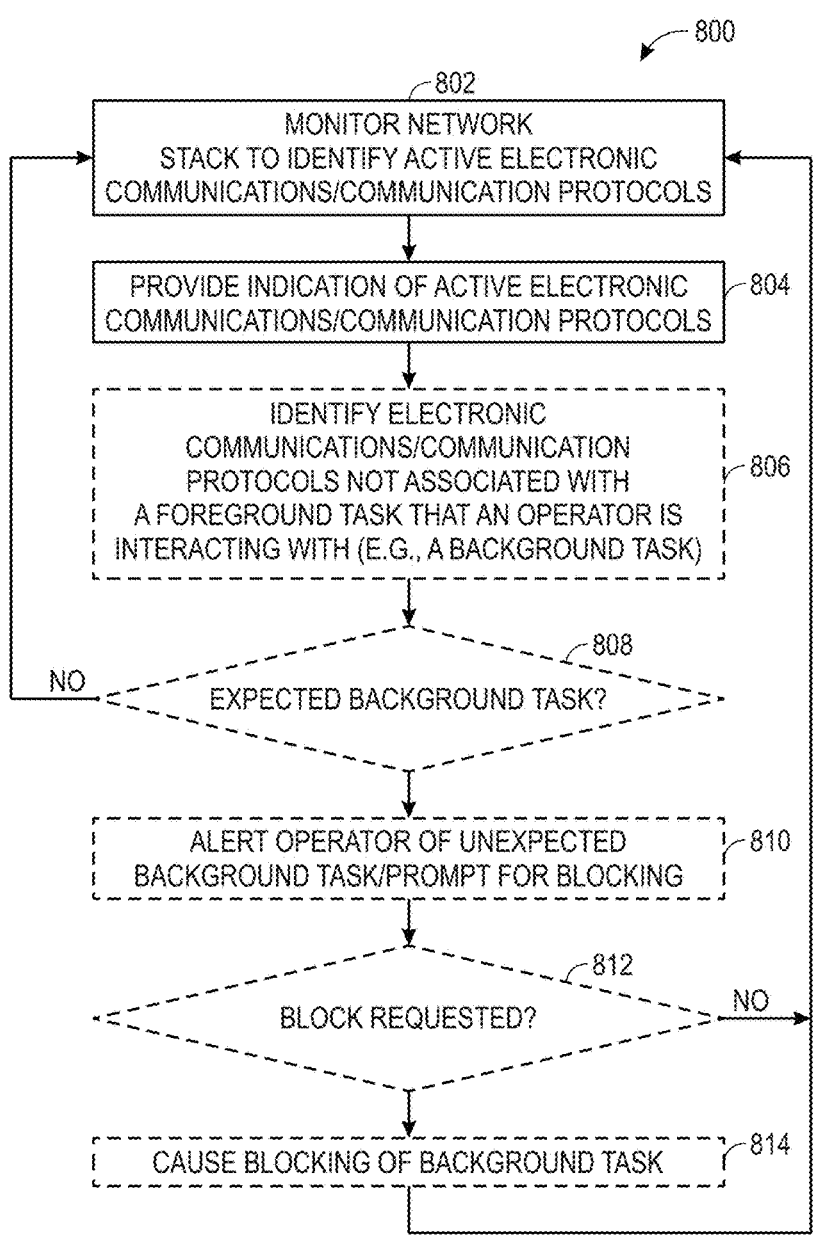
FIG. 8 is a flowchart of a process for monitoring and/or reporting on observed background tasks, according to embodiments of the present disclosure.

FIG. 8 is a flowchart that illustrates a process 800 for monitoring and reporting on executing background tasks, which may be implemented by the network evaluation service 104, as will be described herein. In an additional embodiment of the invention, the network evaluation service 104 may provide additional services, such as evaluating the tasks operating in the background and foreground of one or more computing devices, as described in process 800. In block 802, the network evaluation service 104 may monitor a network stack of the computing device one or more computing devices, for example the computing 106*a* to identify any active electronic communications or communication protocols on the computing device 106*a*.

In block 804, the network evaluation service 104 may provide to the computing device 106*a* an indication of active electronic communications or communication protocols. This indication may appear on the display of the computing device 106*a* so that it is visible to a user of the computing device 106*a*. In some embodiments, this indication may include communications or communication protocols that are associated with a foreground task of the computing device 106*a*. Such a task may include a running app, a browser, a download, or any other task that the computing device 106*a* may operate, such that the task is operating on the foreground of the display of the computing device 106*a*.

In some instances, the network evaluation service 104 may identify communications or communication protocols that are not associated with a foreground task of the computing device 106*a* (block 806). For example, the task may not be one that a user of the computing device 106*a* is interacting with on the display of the computing device 106*a*. For example, the communications or communication protocols may be associated instead with a background task, that a user of the computing device 106*a* may or may not have initiated at a prior time and placed in a background of the computing device 106*a*'s display. For example, in some instances the background task may have been intentionally placed in the background of the computing device 106*a*, for example, a download that a user of the computing device 106*a* may not wish to see on the foreground of the display of the computing device 106*a*. In some instances, however, the background task may not have been initiated by a user of the computing device 106*a*.

In some instances, the network evaluation service 104 may determine whether the electronic communications or communication protocols associated with a background task is an expected background task (block 808). For example, expected background tasks may be those that are routinely initiated by either a user of the computing device 106*a*, or by the computing device 106*a* itself, for example a background virus scan or other background task may be an expected background task of the computing device 106*a*.

In some instances, the background task may be expected by a user of the computing device 106*a*, in which case the network evaluation service 104 may resume the operations described in block 802 of flowchart 800, which operations are described above.

However, in some instances, the background task may not be expected by the user of the computing device 106*a*, for example a background task may be a malicious task initiated by a hacker or other fraudster. To protect the computing device 106*a* from potentially malicious attacks, the network evaluation service 104 may alert the user of the computing device 106*a* of the unexpected background task. In some instances this alert may include a prompt for the user to determine if they would like to block the unexpected background task.

If the user of the computing device 106*a* requests for the unexpected background task to be blocked (block 812), then the network evaluation service 104 can cause the unexpected background task to be blocked (block 814). After blocking the unexpected background task, the network evaluation service 104 may resume operations of block 802 of flowchart 800, which operations are discussed above. Operations of block 802 may also be resumed in the event that the user of the computing device 106*a* opts to not block the unexpected background task. Further, upon blocking of the background task, an entry of possible malicious activity may be added to a malicious activity history of the associated network, which may be used as described above, in the network quality assessment.

Figure 9:
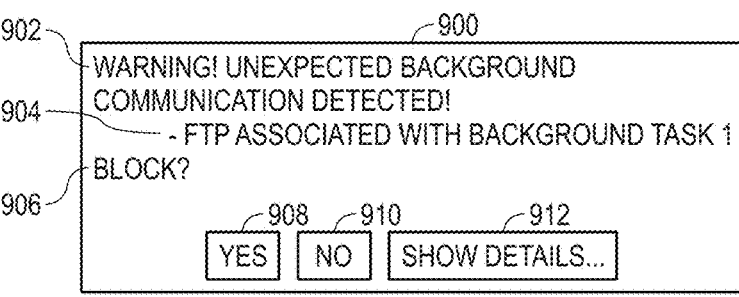
FIG. 9 illustrates an example of a warning that may be provided, indicating unexpected background communica-tion, according to embodiments of the present disclosure.

FIG. 9 is an illustration a graphical warning message 900 that may be implemented by the network evaluation service 104, as will be described herein.

A warning message 900, as shown in FIG. 9, may provide the prompt for blocking described in block 810 of FIG. 8. For instance, in some embodiments the warning message 900 may include a warning prompt 902, which may describe what the warning is for. For example, the warning prompt 902 may alert the user of the computing device 106*a* that an unexpected background communication has been detected. Further, the warning message 900 may include a description 904, which may provide further details of the warning prompt 902. For example, the description 904 may include details that indicate where the background communication was detected, characteristics associated with the background communication (e.g., process name, target destination, etc.), what background task the background communication is associated with, or other important details.

Further, an action prompt 906 may also be included in the warning message 900. The action prompt 906 may prompt the user of the computing device 106*a* to select between options 908, 910, and 912, which may allow the user to choose to block the unexpected background communication (option 908), allow the unexpected background communication to continue (option 910), or obtain further details about the unexpected background communication (option 912). If a user selects the option 908, then the network evaluation service 104 may proceed to operations of block 814 of FIG. 8, which operations are disclosed above. If the user selects the option 910, then the network evaluation service 104 may proceed to the operations of block 802 of FIG. 8, which operations are disclosed above. If the user selects the option 912, then the user may receive further details about the unexpected background communication. From there, the user may then select again between the options 908, 910, and 912.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, computer-readable medium, comprising computer-readable instructions that, when executed by one or more processors, cause the one or more processors to:

receive, from a first set of one or more computing devices, network characteristics of one or more networks that the first set of one or more computing devices are connected to;

evaluate the network characteristics of the one or more networks to determine one or more quality characteristics of each of the one or more networks;

store, as net entries in a database, the one or more quality characteristics of the one or more networks;

receive a network recommendation request from a second set of one or more computing devices;

identify that two or more networks are accessible by the second set of one or more computing devices;

in response to identifying that two or more networks are accessible by the second set of one or more computing devices, determine a quality prioritization of the two or more networks; and submit a recommendation response to the second set of one or more computing devices, wherein the response comprises a recommendation of at least a portion of the one or more networks based upon the evaluated network characteristics and an indication of the quality prioritization.

2. The tangible, non-transitory, computer-readable medium of claim 1, comprising computer-readable instructions that, when executed by the one or more processors, cause the one or more processors to:

determine possible malicious activity as one of the one or more quality characteristics of a particular network.

3. The tangible, non-transitory, computer-readable medium of claim 2, comprising computer-readable instructions that, when executed by the one or more processors, cause the one or more processors to:

determine the possible malicious activity, by:

monitoring a network stack of the particular network to identify unexpected network operations.

4. The tangible, non-transitory, computer-readable medium of claim 3, comprising computer-readable instructions that, when executed by the one or more processors, cause the one or more processors to:

identify the unexpected network operations by comparing foreground network operations with background network operations.

5. The tangible, non-transitory, computer-readable medium of claim 2, comprising computer-readable instructions that, when executed by the one or more processors, cause the one or more processors to:

in response to determining the possible malicious activity, render, in a graphical user interface (GUI) presented to a client device on the particular network, a warning notification of the possible malicious activity.

6. The tangible, non-transitory, computer-readable medium of claim 5, comprising computer-readable instructions that, when executed by the one or more processors, cause the one or more processors to:

receive, via the GUI, a confirmation indication from the user, indicating that the possible malicious activity is believed to be malicious; and in response to the confirmation indication, updating the net entries to indicate a history of possible malicious activity as one of the one or more quality characteristics of the particular network.

7. The tangible, non-transitory, computer-readable medium of claim 2, comprising computer-readable instructions that, when executed by the one or more processors, cause the one or more processors to:

in response to determining the possible malicious activity as one of the one or more quality characteristics of the particular network, refrain from providing the particular network in the recommendation response.

8. The tangible, non-transitory, computer-readable medium of claim 1, comprising computer-readable instructions that, when executed by the one or more processors, cause the one or more processors to:

determine a certification of a particular network with an environment of the particular network as one of the one or more quality characteristics of the particular network.

9. The tangible, non-transitory, computer-readable medium of claim 8, comprising computer-readable instructions that, when executed by the one or more processors, cause the one or more processors to:

determine the certification of the particular network by comparing authentication data supplied by the environment to authentication supplied by the particular network.

10. The tangible, non-transitory, computer-readable medium of claim 1, comprising computer-readable instructions that, when executed by the one or more processors, cause the one or more processors to:

identify two or more overlapping networks accessible in an environment;

compare net entries associated with each of the two or more overlapping networks to identify a particular network that matches criteria of a certified network of the environment; and provide, in the recommendation response, the particular network, while refraining to provide the other networks of the two or more overlapping networks.

11. The tangible, non-transitory, computer-readable medium of claim 1, comprising computer-readable instructions that, when executed by the one or more processors, cause the one or more processors to:

identify two or more overlapping networks accessible in an environment;

compare net entries associated with each of the two or more overlapping networks to identify a particular network that matches criteria of a certified network of the environment; and provide, in the recommendation response, the particular network, appending a name of the environment to a name of the particular network, while refraining to append the name of the environment to names of the other networks of the two or more overlapping networks.

12. The tangible, non-transitory, computer-readable medium of claim 1, wherein the quality prioritization first prioritizes no malicious activity history, certification for an environment, or both, followed by prioritization of other quality characteristics.

13. The tangible, non-transitory, computer-readable medium of claim 1, comprising computer-readable instructions that, when executed by the one or more processors, cause the one or more processors to:

cause presentation of the quality prioritization in an ordered list, starting with a highest prioritized network.

14. The tangible, non-transitory, computer-readable medium of claim 13, wherein the ordered list comprises selectable affordances for each network in the list, that when selected causes the second set of one or more computing devices to connect to a corresponding network.

15. A computer-implemented method, comprising:

receiving, from a first set of one or more computing devices, network characteristics of one or more networks that the first set of one or more computing devices are connected to;

evaluating the network characteristics of the one or more networks to determine one or more quality characteristics of each of the one or more networks;

storing, as net entries in a database, the one or more quality characteristics of the one or more networks;

receiving a network recommendation request from a second set of one or more computing devices;

identifying that two or more networks are accessible by the second set of one or more computing devices;

in response to identifying that two or more networks are accessible by the second set of one or more computing devices, determining a quality prioritization of the two or more networks; and submitting a recommendation response to the second set of one or more computing devices, wherein the recommendation response comprises a recommendation of at least a portion of the one or more networks based upon the evaluated network characteristics and an indication of the quality prioritization.

16. The computer-implemented method of claim 15, comprising:

determining possible malicious activity as one of the one or more quality characteristics of a particular network, by:

monitoring a network stack of the particular network; and identifying unexpected network operations in the network stack, by comparing foreground network operations with background network operations.

17. The computer-implemented method of claim 16, comprising:

determining a certification of a particular network with an environment of the particular network as one of the one or more quality characteristics of the particular network, by:

determining the certification of the particular network by comparing authentication data supplied by the environment to authentication supplied by the particular network.

18. The computer-implemented method of claim 16, comprising:

identifying two or more overlapping networks accessible in an environment;

comparing net entries associated with each of the two or more overlapping networks to identify a particular network that matches criteria of a certified network of the environment; and providing, in the recommendation response, the particular network, while refraining to provide the other networks of the two or more overlapping networks, or providing, in the recommendation response, the particular network, appending a name of the environment to a name of the particular network, while refraining to append the name of the environment to names of the other networks of the two or more overlapping networks.

19. The computer-implemented method of claim 15, wherein the quality prioritization first prioritizes no malicious activity history, certification for an environment, or both, followed by prioritization of other quality characteristics.

* * * * *